No. 669,085. Patented Mar. 5, 1901.
G. HEIDEL.
BATTERY ELECTRODE.
(Application filed Mar. 21, 1900.)
(No Model.)
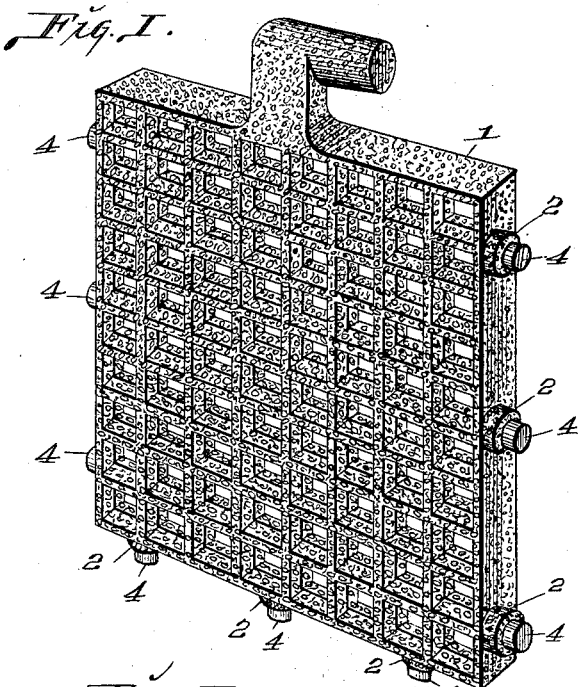
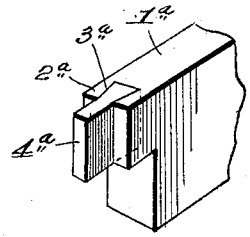
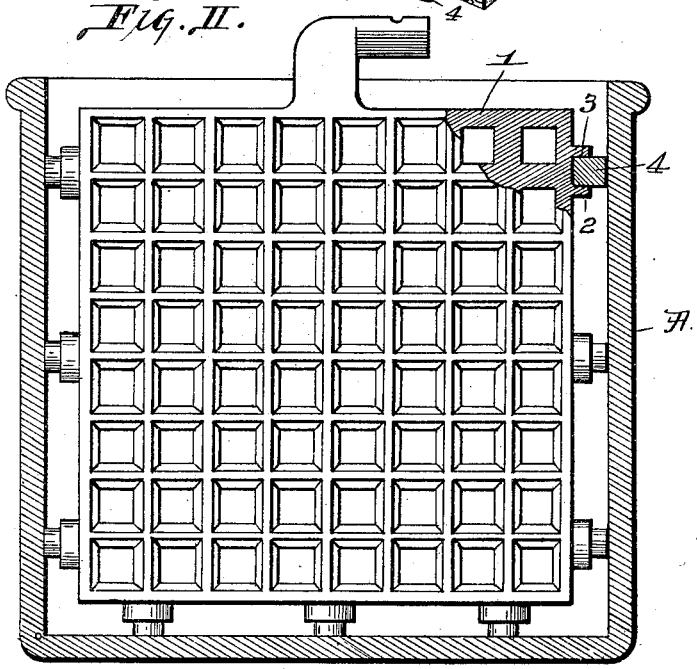
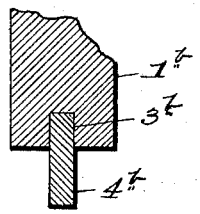
Attest:
D. G. Roe,
E. S. Knight.
Inventor:—
Gustavos Heidel:—
By Wright Bro
atty's.

UNITED STATES PATENT OFFICE.

GUSTAVOS HEIDEL, OF ST. LOUIS, MISSOURI.

BATTERY-ELECTRODE.

SPECIFICATION forming part of Letters Patent No. 669,085, dated March 5, 1901.

Application filed March 21, 1900. Serial No. 9,518. (No model.)

*To all whom it may concern:*

Be it known that I, GUSTAVOS HEIDEL, a citizen of the United States, residing at the city of St. Louis, in the State of Missouri, have invented certain new and useful Improvements in Battery-Electrodes, of which the following is a full, clear, and exact description, reference being had to the accompanying drawings, forming part of this specification.

My invention relates to means for retaining battery-electrodes out of contact with the walls of the cells in which they are contained and supporting the electrodes above the bottoms of the cells, one object of the invention being to insulate the electrodes from the cells, which are made of conducting material, also to support them from contact with the cell-bottoms, so that in addition to their being insulated therefrom a space is provided between the bottom of the cell and the electrode to receive any deposit of scales or particles broken from the electrodes that would, if forming a contact between the electrodes, produce short circuits from one to another of them.

A further object is to prevent jarring of the electrodes against the cells and causing danger of breakage of the electrodes or cells in which they are contained.

The invention consists in the construction and arrangement of parts hereinafter described and claimed.

Figure I is a perspective view of a battery-electrode constructed in accordance with my invention. Fig. II is a view in cross-section of a battery-cell, showing one of my improved electrodes therein in side elevation and partly in section. Fig. III is a detail perspective view of a modification. Fig. IV is a detail sectional view of another modification.

1 designates the electrode, which is preferably of grid form. Protruding from the side edges and lower edge of the electrode are a series of bosses 2, provided with recesses 3, (see Fig. II,) in which are located plugs 4, that extend beyond the ends of the bosses. The plugs 4 may be of rubber, wood, cork, or other suitable material that will withstand the action of the chemicals in which the electrodes may be placed. These plugs are designed to be of sufficient length to project against or into close proximity with the walls of the battery-cell and in such position hold the active bodies of the electrodes out of contact with the cell and permit of the maintenance of the full functions of the electrodes irrespective of the material from which the battery-cells may be made and also, as stated, avoid any danger of the parts becoming broken, a very meritorious feature in connection with battery-electrodes, particularly where the batteries are used upon moving vehicles, in which instance there is constant jarring produced in the battery.

In Fig. III, I have shown a modification wherein the electrode is provided at its edge with a boss $2^a$, containing a dovetail groove $3^a$, that receives a flat plug $4^a$, the inner end of which is tapered to fit in the dovetail groove and to serve the same purpose as the plugs 4.

In Fig. IV, I have shown another modification, wherein the electrode $1^b$ has a straight-sided recess $3^b$ in the edge thereof, that receives the inner end of a correspondingly-shaped plug $4^b$.

I claim as my invention—

The combination with a battery-electrode, of recessed bosses protruding from the edges thereof, and plugs seated in said bosses adapted to serve as insulators between the electrode and the battery-cell, substantially as described.

GUSTAVOS HEIDEL.

In presence of—
 E. S. KNIGHT,
 N. V. ALEXANDER.